United States Patent [19]
Lee et al.

[11] Patent Number: 5,533,338
[45] Date of Patent: Jul. 9, 1996

[54] CRYOGENIC VAPOR RECOVERY PROCESS AND SYSTEM

[75] Inventors: Ron C. Lee, Bloomsbury; Michael D. Heil, Hoboken; Michael T. Downey, Bridgewater; Michael J. Barrasso, Westfield, all of N.J.

[73] Assignee: The BOC Group, Inc., New Providence, N.J.

[21] Appl. No.: 407,818

[22] Filed: Mar. 21, 1995

[51] Int. Cl.⁶ .................................................. F25J 5/00
[52] U.S. Cl. .................. 62/638; 62/116; 62/500; 62/641
[58] Field of Search ................... 62/9, 11, 116, 62/500, 48.1, 12

[56] References Cited

U.S. PATENT DOCUMENTS

| | | | |
|---|---|---|---|
| 3,854,914 | 12/1974 | Leyarovski et al. | 62/12 |
| 3,967,938 | 7/1976 | Daeschler et al. | 55/30 |
| 4,637,216 | 1/1987 | Shenoy et al. | 62/500 |
| 5,291,738 | 3/1994 | Waldrop | 62/36 |
| 5,291,751 | 3/1994 | Perez et al. | 62/332 |
| 5,456,084 | 10/1995 | Lee | 62/500 |

*Primary Examiner*—Ronald C. Capossela
*Attorney, Agent, or Firm*—David M. Rosenblum; Larry R. Cassett

[57] ABSTRACT

A process and system for removing condensable vapors contained within the gas stream in accordance with the process and system, condensable vapors contained within the gas stream are condensed within one or more condensers through indirect heat exchange of the gas stream with a refrigerant stream. This produces a refrigerated gas stream and a heated refrigerant gas stream. Further heat is exchanged from at least part of the heated refrigerant stream to the refrigerated gas stream and in economizing heat exchanger to form a cooled refrigerant stream from the heated refrigerant stream. The refrigeration stream is produced by combining a cryogenic stream with the at least part of the cooled refrigerant stream in a mixing chamber of an ejector or analogous equipment.

20 Claims, 2 Drawing Sheets

CRYOGENIC VAPOR RECOVERY PROCESS AND SYSTEM

BACKGROUND OF THE INVENTION

The present invention relates to a cryogenic vapor recovery process and system for removing condensable vapors from a gas stream by condensation. More particularly, the present invention relates to such a process and apparatus in which refrigeration for the condensation is provided by a cryogenic refrigerant and the refrigeration imparted to the gas stream by the cryogenic refrigerant is at least partly recovered. More particularly, the present invention relates to such a process and apparatus in which two condensers are operated out of phase so that one of the condensers is on-line and operating to condense the vapors out of the gas stream while the other condenser is off-line and is being defrosted prior to being brought on-line.

The prior art has provided cryogenic vapor recovery systems for removing condensable vapors contained within a gas stream. An example of such a system is disclosed in U.S. Pat. No. 5,291,751, in which condensable vapors contained within a gas stream are removed from the gas stream by a hybrid system. In this hybrid system, the gas stream first passes through one or more mechanical refrigeration stages and then is routed to two cryogenic refrigeration stages having cryogenic heat exchangers to condense the condensable vapors from the gas stream. The two cryogenic refrigeration stages are operated out of phase so that when one heat exchanger is fully loaded up with solid condensate, the operation is switched to the other heat exchanger, and vice-versa to allow each of the heat exchangers to operate as condensers while the opposite heat exchanger is defrosted. U.S. Pat. No. 3,967,938 shows a cryogenic vapor recovery system, specifically designed to condense gasoline vapors from a gasoline tank, which utilizes propane as the refrigerant.

Another example of a cryogenic vapor recovery system is illustrated in U.S. Pat. No. 5,291,738 in which the gas stream passes through a mechanical chiller, an economizing heat exchanger, a main condenser which is refrigerated by a liquid nitrogen loop, and a mist eliminator. The refrigeration imparted to the gas stream by the nitrogen loop is at least partly recovered in the economizing heat exchanger where heat is indirectly exchanged between the gas stream as it enters the system with the gas stream prior to its discharge from the system. The main condenser is defrosted by recirculating part of the gas stream after having been heated through a heater. Since the defrosting requires a system shut-down, duplicate systems would have to be operated in order to provide continuous operation. U.S. Pat. No. 5,291,738, as contrasted with the foregoing reference patents, recognizes that refrigeration is imparted to the gas stream and if the gas stream is not recirculated, the refrigeration is lost. However, since the refrigeration is recovered upstream of the condenser, freezing of the condensables can occur before the condensers to cause blockage of the system.

As will be discussed, the present invention provides a cryogenic vapor recovery system in which refrigeration from the gas to be processed is at least partly recovered in such a manner that the system is amenable to be designed for continuous operation without duplication of the entire system and in which the freezing of the condensables is constrained to occur within condensers used in connection with the system.

SUMMARY OF THE INVENTION

The present invention provides a cryogenic vapor recovery process for removing condensable vapors contained within a gas stream. In accordance with the process, the condensable vapors are condensed from the gas stream by indirectly exchanging heat from the gas stream to a refrigerant stream to thereby produce a refrigerated gas stream and a heated refrigerant stream. The heat is exchanged from at least part of the heated refrigerant stream to the refrigerated gas stream to form a cooled refrigerant stream from the heated refrigerant stream. The refrigerant stream is produced by combining a cryogenic stream (a liquid or gaseous cryogen or a stream having a mixture of liquid and gaseous phases of a cryogen) with at least part of the cooled refrigerant stream.

In another aspect, the present invention provides a cryogenic vapor recovery system for removing condensable vapors contained within a gas stream. The system comprises a condensing means for indirectly exchanging heat from the gas stream to refrigerant stream. The condensing means condenses the condensable vapors from the gas stream and produces a refrigerated gas stream and a heated refrigerant stream. A heat exchange means is connected to the condensing means for exchanging further heat from at least part of the heated refrigerant stream to the refrigerated gas stream to form a cooled refrigerant stream from the heated refrigerant stream. A means is provided for combining a cryogenic stream with at least part of the cooled refrigerant stream. This combination produces the refrigerant stream. The means also produces circulation within the apparatus so that the refrigerant stream flows to the condensing means, the at least part of the heated refrigerant stream flows to the economizing heat exchange means, and the at least part of the cooled refrigerant stream flows from the economizing heat exchange means to combine with the at least part of the cooled refrigerant stream.

The present invention is very amenable to being incorporated within the design of cryogenic vapor recovery systems utilizing multiple condensers for continuous operation because refrigeration is recovered in the refrigerant stream rather than in the gas stream to be processed. Moreover, since refrigeration is recovered downstream of the condensers and is then recovered in the refrigerant stream, there is no possibility of premature freezing of the condensables occurring upstream of the condensers.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION OF DRAWINGS

Figure 1:
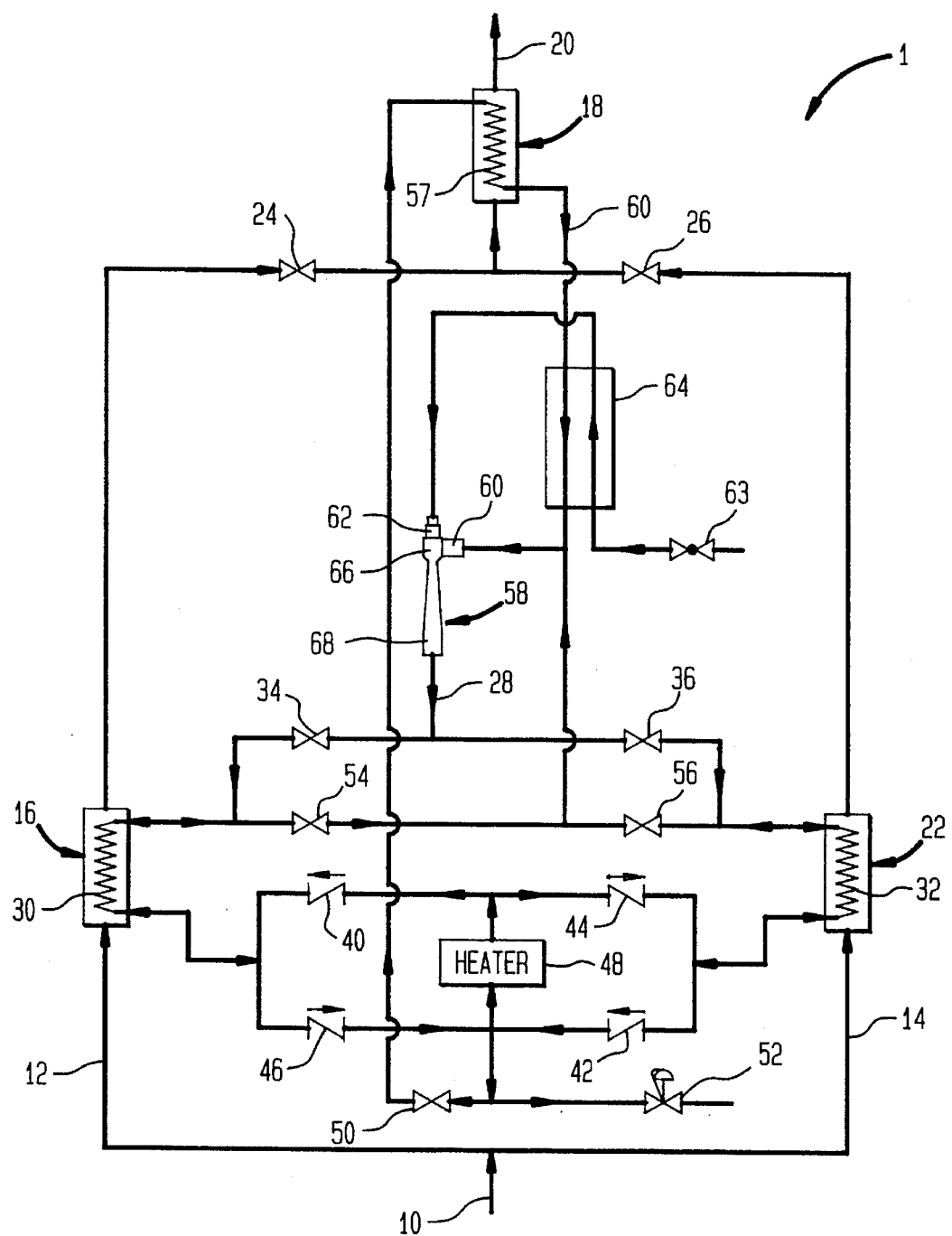
FIG. 1 is a schematic diagram of a cryogenic vapor recovery system in accordance with the present invention.

With reference to FIG. 1., a cryogenic vapor recovery system 1 is illustrated which is designed to remove condensable vapors from a gas stream. Although not illustrated, the gas stream could be pre-refrigerated by a mechanical refrigerator or other refrigeration device. For instance refrigeration could be effected with a cold refrigerant gas used in cryogenic vapor recovery system 1.

The gas stream, prior to treatment in system 1 includes the condensable vapors. The untreated gas stream enters system 1 through a system inlet 10 and can then flow through either of two alternate flow paths 12 or 14. In flow path 12, the gas stream flows through a condenser 16 and then through an economizing heat exchanger 18. Condensable vapor is removed from the gas stream in condenser 16 and refrigeration that is imparted to the gas stream in condenser 16 is at least partly recovered in economizing heat exchanger 18. As can be appreciated, since condensable vapors are being removed from the gas stream within condenser 16, only part of the refrigeration can be recovered. The gas stream, now treated by removal of the condensable vapors, is discharged from system 1 through system outlet 20. In flow path 14, the gas stream flows through condense 22 to condense out condensable vapors and then through economizing heat exchanger 18 for recovery of refrigeration. Thereafter, the gas stream is discharged from system 1 through system outlet 20.

As can be appreciated, depending upon the type of gas stream to be treated, part or all of the condensable vapors will form as frost on condensers 16 and 22. In this regard, in most applications, a major portion of the condensable vapors will condense as liquid. Therefore, although not illustrated, condensers 16 and 22 would have to be provided with a drainage system. A point will be reached, however, where each of the two condensers 16 and 22 have to be defrosted in order to continue in operation. The alternative flow paths, discussed above, allows for continuous operation by permitting one of the two condensers 16 and 22 to remain in an on-line condition while the other of the two condensers 16 and 22 is in an off-line condition and is being defrosted. After the defrosting of the other of the two condensers 16 and 22, the formerly off-line condenser is activated to be in an on-line condition while the condenser previously in the on-line condition is brought off-line and is defrosted.

Flow through alternate flow paths 12 and 14 is controlled by on-off control valves 24 and 26. When valve 24 is set in the open position and valve 26 is set in the closed position, the gas stream flows through flow path 12. When valve 26 is set in the open position and when valve 24 is set in the closed position, the gas stream flows through flow path 14. Valves 24 and 26 are preferably the type that are activated for remote operation from automated control systems such as a programmable controller, either digital or analog. It is of course possible to carry out the present invention manually, without the use of automated equipment. Unless indicated otherwise, all valves herein are such on-off valves except where such valves are indicated as being check valves to control flow direction.

Condensation of the condensable vapors within either condenser 16 or condenser 22 is effectuated by a refrigerant stream which flows along a reversible flow circuit having an inlet 28 and valving for introducing the refrigerant stream into pass 30 of condenser 16 and then into pass 32 of condenser 22 and vice-versa. When condenser 16 is in the on-line condition, valve 34 is set in an open position and valve 36 is set in the closed position to permit flow of the refrigerant stream through pass 30 of condenser 16 to become a heated refrigerant stream. Check valves 40, 42, 44 and 46 act in concert to permit flow of a portion of the heated refrigerant stream from condenser 16 through control valve 46 and a heater 48 of conventional construction, check valve 44 and then into pass 32 of condenser 22. Condenser 22 is in the off-line condition and the heated refrigerant acts to defrost condenser 22. As will be discussed in more detail, a valve 50 is set in the open position to direct a part of a remaining portion of the heated refrigeration stream to economizing condenser 18 and a pressure relief valve 52 acts to vent another part of the remaining portion of the heated refrigerant stream from system 1. As will also be discussed in more detail hereinafter, a valve 54 is set in the closed position while a valve 56 is set in the open position to direct the portion of the heated refrigeration stream, after its passage through pass 32 of condenser 22 to an ejector, which will also be described in more detail hereinafter, for purposes of refrigeration recovery.

After condenser 22 is defrosted and/or after condenser 16 requires a defrosting for continued operation, valve 34 is set in the closed position and valve 36 is set in the open position to allow the refrigerant stream to reverse its direction and now flow through pass 32 of condenser 22 to become a heated refrigerant stream. In this regard, the a portion of the heated refrigerant stream flows from condenser 22 through check valve 42, heater 48, check valve 40 and pass 30 of condenser 16. Condenser 16 is thus in the off-line condition and is being defrosted by the heated refrigerant and condenser 22 is the on-line condenser serving to condense the condensable vapor from the gas stream. Again valve 50 is set in an open position for the purpose mentioned above and valve 52 acts as a system vent. Valve 54 is now set in the open position and valve 56 is set in the closed position to direct the portion of the heated refrigeration stream, after its passage through pass 30 of condenser 16 to the ejector.

In the illustrated embodiment, only a portion of the heated refrigerant stream needs to serve defrosting duty. As indicated above, part of the remaining heated refrigerant stream (not used in defrosting service) flows through a valve 50 which is set in an open position for this purpose. Such remaining portion of the heated refrigerant stream that flows through valve 50 flows through a pass 57 in economizing heat exchanger 18 where it is cooled to recover a portion of the refrigeration imparted to gas stream by passage of the refrigerant stream through condensers 16 or 22. The portion of the heated refrigerant stream after passage through pass 57 of economizing heat exchanger 18 becomes a cooled refrigerant stream. The other remaining portion of the heated refrigerant stream is vented through a pressure relief valve 52 which acts to vent a mass flow rate of the heated refrigerant stream equal to the mass flow rate of liquid cryogen make-up entering vapor recovery system 1.

As indicated above, when valve 34 is set in the open position, valve 54 is set in the closed position and valve 56 is set in the open position to allow that part of the refrigerant that has passed through pass 32 of condenser 22, in its defrost cycle, to mix with the cooled refrigerant stream that has been cooled within economizing heat exchanger 18. Since the portion of the refrigerant stream is being cooled during defrosting service it can be thought of as another or further cooled refrigerant stream from which refrigeration can be recycled for economy purposes. When valve 36 is set in the open position, valve 56 is set in the closed position to allow the other or further cooled refrigerant stream formed from that part of the refrigerant that has passed through pass 30 of condenser 16 to mix with the cooled refrigerant stream. The resultant mixture, combines with an incoming cryogenic stream to form the refrigerant stream to be introduced into inlet 28 of the reversing flow circuit, described above.

It is to be noted that valve 50 could be a proportional valve instead of an on/off valve. In such case closing valve 50 would cause more heated refrigerant to be utilized for defrosting purposes rather than refrigeration recovery within economizing heat exchanger 18. Valves 54 and 56 could be proportional valves which would also serve to adjust the balance between flow of heated refrigerant between condensers 16 and 22 and economizing heat exchanger 18.

Prior to the switch over between on-line and off-line conditions for either of condensers 16 or 22, both valves 34 and 36 can be set in an open position and both valves 54 and 56 can be set in the closed position. This will cause the refrigerant stream to be divided into two portions. If, for instance, condenser 16 were on-line and condenser 22 were off-line, the portion entering condenser 16 would continue to act in a condensing duty. The portion of the refrigerant stream entering condenser 22 would be serving a pre-cooling duty, the defrosting of condenser 22 having just been completed. The two portions of the refrigerant stream after having passed through condensers 16 and 22 will form two partial heated refrigerant streams flowing through check valves 46 and 42 to thereafter combine to form a combined heated refrigerant stream to be in part recycled to economizing heat exchanger 18 through valve 50 which is set in an open position for this purpose and in part be vented from valve 52.

The combining of the mixture of the cooled refrigerant stream and the portion of heated refrigeration stream used in defrosting condensers 16 and 22 and incoming liquid cryogen make-up is effectuated by an ejector 58. Ejector 58 also causes circulation of the refrigerant as described hereinabove. Ejector 58 has a low pressure inlet 60 for the mixture of the cooled refrigerant stream and the portion of the heated refrigerant stream. A high pressure inlet 62 is provided for introduction of a cryogenic stream. A pressurized liquid cryogen stream enters system 1 through control valve 63. Enthalpy can be added to the incoming pressurized liquid cryogen via a recirculation heat exchanger 64 which serves to indirectly exchange heat between liquid cryogen stream 62 and the cooled refrigerant stream emanating from economizing heat exchanger 18. The result of such heat exchange is that the cryogenic stream entering high pressure inlet 62 can be either liquid, gas or two-phase. The increase in enthalpy increases the circulation work capable of being produced by the incoming liquid cryogen. Ejector 58 has a mixing chamber 66 in which the cryogenic stream is injected through a venturi. This creates a low pressure region within mixing chamber 66 to draw the mixture of the cooled refrigerant stream and the heated refrigerant streams into combination with the cryogenic stream. After pressure recovery via a diffuser section 68 of ejector 58, the resultant refrigerant stream is discharged to inlet 28 of the reversing circuit.

As can be appreciated by those skilled in the art, ejector 58 could be replaced by any venturi-like device in which a cryogenic stream is able to serve as a motive fluid to produce a low pressure region to draw the cooled and further cooled refrigerant streams. Ejector 58 could also be replaced or perhaps supplemented by a circulation pump to circulate the refrigerant and a piping tee to serve as a mixing chamber. The advantage of ejector 58 over a pump is in simplicity of operation and without external power consumption as would be required with a pump. Additionally, a pump acts as an input to system 1 of sensible heat.

Figure 2:
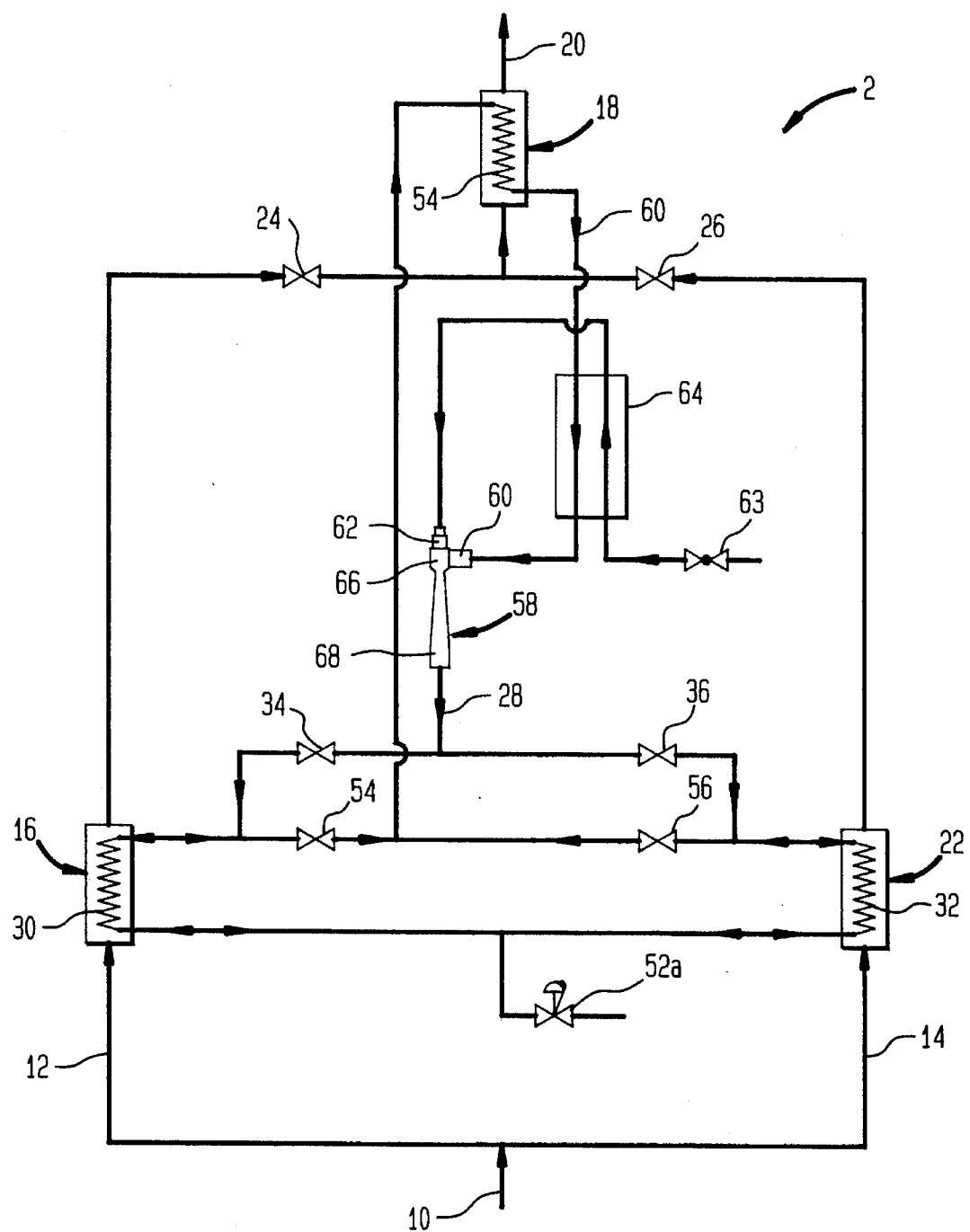
FIG. 2 is a schematic diagram of an alternative embodiment of a cryogenic vapor recovery system in accordance with the present invention. In order to avoid needless repetition in the explanation of this embodiment, reference numbers of FIG. 1 are also used in this diagram for elements which share a common function.

It is to be understood that many possible alternative embodiments could be employed in accordance with the present invention. For instance, depending on the application for the present invention a heater, such as heater 48 might not be necessary. Also, all of the heated refrigerant stream could flow through the condenser to be defrosted and then to economizing heat exchanger 18. In any embodiment, venting of refrigerant could be either upstream or downstream of economizing heat exchanger 18. With reference to FIG. 2, a cryogenic vapor recovery system 2 is illustrated in which there is no heater and no check valves. No pre-cooling and no recirculation of further cooled refrigerant stream is possible in system 2. Operation of valves 54 and 56 causes all of the heated refrigerant stream, after having served defrosting duty, to be sent in the direction of economizing heat exchanger 18. Part of the flow of heated refrigerant stream is vented through pressure relief valve 52a, located between condensers 16 and 22. Venting could also be effected either upstream or downstream of economizing heat exchanger 18. This would be less advantageous than the illustrated placement of vent 52a. The present invention also covers a possible embodiment in which there is a single condenser. In such possible embodiment, there would have to be system duplication to allow for continuous operation.

In any embodiment in accordance with the present invention it is preferable that the refrigerant stream comprise mostly vapor through complete vaporization of the incoming liquid cryogen make-up stream so that vaporization does not occur in either of condensers 16 and 22. The use of a refrigerant stream made up of vapor allows for there to be a closer match between the heating and cooling curves of the refrigerant and the process gas within condensers 16 and 22. This match produces an efficiency in operation which can be translated into a better condensing efficiency than prior art systems in which incoming liquid cryogen vaporizes within the condensers. This type of operation, possible in the present invention, is yet another advantage of the present invention over the prior art.

While the invention has been described with reference to a preferred embodiment, it will occur to those skilled in the art that numerous changes, additions and omissions can be made without departing from the spirit and scope of the present invention.

We claim:

1. A cryogenic vapor recovery process for removing condensable vapors contained within a gas stream, said process comprising:

condensing said condensable vapors from said gas stream by indirectly exchanging heat from said gas stream to a refrigerant stream, thereby producing a refrigerated gas stream and a heated refrigerant stream;

indirectly exchanging further heat from at least part of said heated refrigerant stream to said refrigerated gas stream to form a cooled refrigerant stream from said heated refrigerant stream; and producing said refrigerant stream by combining a cryogenic stream with at least part of said cooled refrigerant stream.

2. The process of claim 1, wherein:

said heat is indirectly exchanged between said gas stream to said refrigerant stream in two condensers so that a frost containing at least part of said condensables forms within said two condensers;

said two condensers are operated in accordance with a cycle so that one of said two condensers is in an on-line condition and operating to effect said indirect heat exchange and said other of said two condensers is in an off-line condition and is defrosted while in said off-line condition and vice-versa; and said gas stream is directed to one and then said other of said two condensers, and vice-versa, to effect said indirect heat exchange from said gas stream to said refrigerant stream.

3. The process of claim 2, wherein each of said two condensers is defrosted by introducing at least a portion of said heated refrigerant stream into each of said two condensers while in said off-line condition.

4. The process of claim 3, further comprising passing said at least said portion of said heated refrigerant stream into a heater prior to introducing said heated refrigerant stream into each of said two condensers.

5. The process of claim 2, wherein:

prior to utilizing each of said condensers in said on-line condition, said refrigerant stream is divided into two portions which are respectively introduced into said two condensers to pre-cool each of said two condensers when in said off-line condition and thereby to form two partial heated refrigerant streams from said two portions of said refrigerant stream after having passed through said two condensers;

said two partial heated refrigerant streams are combined to form a combined heated refrigerant stream; and said at least part of said heated refrigerant stream serving to indirectly exchange heat from said gas stream is formed from said combined heated refrigerant stream.

6. The process of claim 2, wherein:

each of said two condensers is defrosted by introducing a portion of said heated refrigerant stream into each of said two condensers and vice-versa, while in said off-line condition, thereby to form a further cooled refrigerant stream;

said refrigerant stream is produced by combining said further cooled refrigerant stream with said at least part of said cooled refrigerant stream and said cryogenic stream;

at least part of a remaining portion of said heated refrigerant stream forms said at least part of said heated refrigerant stream that indirectly exchanges heat to said gas stream; and a part of said heated refrigerant stream having a mass flow rate equal to that of said cryogenic stream is vented from said process.

7. The process of claim 6, further comprising heating said portion of said heated refrigerant stream by passing said portion of heated refrigerant stream into a heater prior to introducing said portion of said heated refrigerant stream into each of said two condensers.

8. The process of claim 6, wherein:

said remaining portion of said heated refrigerant stream is divided into two parts, one of said two parts of said heated refrigerant stream comprising said part of said heated refrigerant stream having said mass flow rate equal to that of said cryogenic stream;

said other of said two parts of said heated refrigerant stream comprises said at least part of said remaining portion of said heated refrigerant stream serving to indirectly exchange heat with said gas stream.

9. The process of claim 6, wherein:

prior to utilizing each of said condensers in said on-line condition, said refrigerant stream is divided into two portions which are respectively introduced into said two condensers to pre-cool each of said two condensers when in said off-line condition and thereby to form two partial heated refrigerant streams from said two portions of said refrigerant stream after having passed through said two condensers;

said two partial heated refrigerant streams are combined to form a combined heated refrigerant stream; and said at least part of said heated refrigerant stream serving to indirectly exchange heat from said gas stream is formed from said combined heated refrigerant stream.

10. The process of claim 1, wherein said cryogenic stream is vaporized upon combination with said cooled refrigerant stream.

11. A cryogenic vapor recovery system for removing condensable vapors contained within a gas stream, said system comprising:

condensing means for indirectly exchanging heat from said gas stream to a refrigerant stream, thereby to condense said condensable vapors from said gas stream and to produce a refrigerated gas stream and a heated refrigerant stream;

economizing heat exchange means connected to said condensing means for exchanging further heat from at least part of said heated refrigerant stream to said refrigerated gas stream to form a cooled refrigerant stream from said heated refrigerant stream; and means for combining a cryogenic stream with at least part of said cooled refrigerant stream, thereby to produce said refrigerant stream and for producing circulation within said system so that said refrigerant stream flows to said condensing means, said at least part of said heated refrigerant stream flows to said economizing heat exchange means and said at least part of the cooled refrigerant stream flows from said economizing heat exchange means to combine with said at least part of said cooled refrigerant stream.

12. The system of claim 11, further comprising:

said condensing means comprising two condensers, each forming a frost from said condensation containing at least part of said condensable vapors;

reversing flow circuit means connected between said combining and circulation producing means and said two condensers for introducing said refrigerant stream into one of said two condensers to produce said heated refrigerant stream and then a portion of said heated refrigerant stream to the other of said two condensers and vice-versa so that said one of said two condensers is in an on-line condition and operating to effect said indirect heat exchange and said other of said two condensers is in an off-line condition and being defrosted by said portion of said heated refrigerant stream, and vice-versa; and gas stream means having a branched flow path for directing said gas stream through said one of said two condensers and said economizing heat exchange means when said one of said two condensers is in the on-line condition and for directing said gas stream through said other of said two condensers and said economizing heat exchange means when said other of said two condensers is in the on-line condition.

13. The system of claim 12, further including a heater interposed within said reversing flow circuit means so that said further part of said heated refrigerant stream is further heated by said heater prior to said introduction of said heated refrigerant stream into each of said two condensers.

14. The system of claim 12, wherein:

said reversing flow circuit means further has means for dividing said refrigerant stream into two portions, for simultaneously introducing said two portions of said refrigerant stream into said two condensers to pre-cool each of said two condensers prior to their serving in the on-line condition and thereby to form two partial heated refrigerant streams from said two portions and for recombining said two partial heated refrigerant streams to form a combined heated refrigerant stream; and said reversing flow circuit means configured such that said at least part of said heated refrigerant stream serving to indirectly exchange heat from said gas stream is formed from said combined heated refrigerant stream when said refrigerant stream is divided into said two portions.

15. The system of claim 12, wherein said reversing flow circuit is configured to connect each of said two condensers, while in said off-line condition to said combining means so that after said portion of said heated refrigerant stream flows through said two condensers, it is converted to a further cooled refrigerant stream that combines with said at least part of said cooled refrigerant stream and said cryogenic cryogen stream to form said refrigerant stream.

16. The system of claim 15, further comprising a heater interposed within said reversing flow circuit means so that said further part of said heated refrigerant stream is further heated by said heater prior to said introduction of said heated refrigerant stream into each of said two condensers.

17. The system of claim 16, wherein said reversing flow circuit has a vent to vent part of a remaining portion of said heated refrigerant stream having a mass flow rate equal to that of said cryogenic stream and said vent is positioned within said reversing flow circuit so that another part of said remaining portion of said heated refrigerant stream forms said at least part of said heated refrigerant stream indirectly exchanging heat to said refrigerated gas stream in said economizing heat exchange means.

18. The system of claim 17, wherein said combining and circulation producing means comprises an ejector having high and low pressure inlets in communication with a mixing chamber, said high pressure inlet receiving said cryogenic stream when said system is in use and said low pressure inlet connected to said economizing heat exchange means and said reversing circuit to receive said cooled and further cooled refrigerant streams, respectively, said ejector also having a high pressure outlet in communication with said reversing circuit to discharge said refrigerant stream thereto.

19. The system of claim 11, wherein said combining and circulation producing means comprises an ejector having high and low pressure inlets in communication with a mixing chamber to receive said cryogenic stream and said at least part of said heated refrigerant stream and a high pressure outlet to discharge said refrigerant stream.

20. The system of claim 19 or claim 18 further comprising recirculation heat exchange means for indirectly transferring additional heat from said cooled refrigerant stream to said cryogenic stream in a liquid form.

* * * * *